United States Patent [19]

Kim

[11] Patent Number: 5,696,620

[45] Date of Patent: Dec. 9, 1997

[54] THIN FILM ACTUATED MIRROR ARRAY INCORPORATING THEREIN TEMPERATURE COMPENSATING LAYERS

[75] Inventor: Myoung-Jin Kim, Seoul, Rep. of Korea

[73] Assignee: Daewoo Electronics Co., Ltd., Seoul, Rep. of Korea

[21] Appl. No.: 624,165

[22] Filed: Mar. 29, 1996

[30] Foreign Application Priority Data

Mar. 31, 1995 [KR] Rep. of Korea ................ 95-7398

[51] Int. Cl.⁶ ...................................... G02B 26/00
[52] U.S. Cl. .................. 359/291; 359/224; 359/850; 359/900; 437/229
[58] Field of Search ........................ 359/212, 213, 359/214, 223, 224, 247, 290, 291, 295, 318, 846, 847, 848, 849, 850, 851, 900; 437/229

[56] References Cited

U.S. PATENT DOCUMENTS 5,608,569 3/1997 Kim ............................... 359/291
5,610,773 3/1997 Min ............................... 359/850

*Primary Examiner*—David C. Nelms
*Assistant Examiner*—Dawn-Marie Bey
*Attorney, Agent, or Firm*—Anderson Kill & Olick, P.C.

[57] ABSTRACT

An array of M×N thin film actuated mirrors includes an active matrix; an array of M×N supporting members; and an array of M×N actuating structures, each of the actuating structures being provided with an actuating and a light reflecting portions and including a first thin film electrode, a thin film electrodisplacive member, a second thin film electrode, an elastic member, an insulating member, a temperature compensating member and a conduit. Furthermore, the method for the manufacture of the array includes the steps of: providing an active matrix; depositing a thin film sacrificial layer; creating an array of empty slots; forming a supporting member; depositing a temperature compensating layer; removing selectively the temperature compensating layer; depositing an elastic layer; forming a conduit; depositing a second thin film and a thin film electrodisplacive layers; patterning the thin film electrodisplacive and the second thin film layers; depositing a first thin film layer; removing selectively the first thin film layer; forming an insulating member; patterning the first thin film, the elastic and the temperature compensating layers; and removing the thin film sacrificial layer thereby forming the array of M×N thin film actuated mirrors.

13 Claims, 9 Drawing Sheets

THIN FILM ACTUATED MIRROR ARRAY INCORPORATING THEREIN TEMPERATURE COMPENSATING LAYERS

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

The process for manufacturing the array 100 begins with the preparation of an active matrix 10, having a top surface and comprising a substrate 12, an array of M×N transistors (not shown) and an array of M×N connecting terminals 14.

In a subsequent step, there is formed on the top surface of the active matrix 10 a thin film sacrificial layer 24 by using a sputtering or an evaporation method if the thin film sacrificial layer 24 is made of a metal, a chemical vapor deposition(CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots(not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes(not shown), each of the holes extending from top of the elastic layer 30 to top of the connecting terminals 14, by using an etching method; and filling therein with the metal to thereby form the conduit 26, as shown in FIG. 1B.

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate(PZT), is formed on top of the second thin film layer 40 by using a sputtering method, a CVD method or a Sol-Gel method, as shown in FIG. 1C.

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the supporting layer 20 is exposed, as shown in FIG. 1D. Each of the second thin film electrodes 45 is electrically connected to the transistor through the conduit 26 formed in each of the supporting members 22 and functions as a signal electrode in the thin film actuated mirrors 101.

Next, each of the thin film electrodisplacive members 55 is heat treated at a high temperature, e.g., for PZT, around 650° C., to allow a phase transition to take place to thereby form an array of M×N heat treated structures(not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a common bias electrode in the thin film actuated mirrors 101.

The preceeding step is then followed by completely covering the top surface and the four side surfaces in each of the actuated mirror structures 111 with a thin film protection layer(not shown).

The thin film sacrificial layer 24 in the supporting layer 20 is then removed by using an etching method. Finally, the thin film protection layer is removed to thereby form the array 100 of M×N thin film actuated mirrors 101, as shown in FIG. 1G.

One of the major drawbacks of the above described array 100 of M×N thin film actuated mirrors 101 is the optical efficiency thereof resulting from the difference in the thermal expansion coefficient of the thin film layers constituting each of the thin film actuated mirrors 101. For example, when the temperature around the array 100 changes, the thin film layers constituting each of the thin film actuated mirrors 101 may expand or contract by a different amount, affecting the structural integrity of each of the thin film actuated mirrors 101 making the proper reflection and modulation of an incident light beam difficult therefrom, thereby decreasing the optical efficiency of the array 100.

SUMMARY OF THE INVENTION

It is, therefore, a primary object of the present invention to provide an array of M×N thin film actuated mirrors for use in an optical projection system capable of providing a proper reflection and modulation of a light beam incident thereupon even in the presence of a drastic temperature fluctuation.

It is another object of the present invention to provide a method for the manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix including a substrate with an array of M×N connecting terminals and an array of M×N transistors, wherein each of the connecting terminals is electrically connected to a corresponding transistor in the array of transistors; an array of M×N supporting members; and an array of M×N actuating structures, each of the actuating structures being cantilevered to each of the supporting members, each of the actuating structures including a first thin film electrode, a thin film electrodisplacive member, a second thin film electrode, an elastic member, an insulating member, a temperature compensating member and a conduit, the first and the second thin film electrodes being placed at top and bottom of the thin film electrodisplacive member, respectively, the elastic member being placed at bottom of the second thin film electrode, the temperature compensating member being located below the elastic member, and each of the actuating structures being divided into an actuating and a light reflecting portions, wherein the actuating portion includes a front portion of the first thin film electrode functioning as a mirror and a bias electrode in each of the actuating structures, the thin film electrodisplacive member, the second thin film electrode functioning as a signal electrode by being electrically connected to the connecting terminal through the conduit, a front portion of the elastic member and a portion of the temperature compensating member, and the light reflecting portion is provided with the remaining portion of the first thin film electrode functioning also as the mirror, that of the elastic member and that of the temperature compensating member, the insulating member defining the actuating and the light reflecting portions by electrically disconnecting the front portion and the remaining portion of the first thin film electrode in each of the actuating structures.

In accordance with another aspect of the present invention, there is provided with a method for the manufacture of an array of M×N thin film actuated mirrors, wherein M and N are integers, for use in an optical projection system, the method comprising the steps of: providing an active matrix including a substrate with an array of M×N connecting terminals and an array of M×N transistors; depositing a thin film sacrificial layer on top of the active matrix; creating an array of M×N empty slots in the thin film sacrificial layer, each of the empty slots being located around top of the connecting terminals; forming a supporting member in each of the empty slots; depositing a temperature compensating layer on top of the thin film sacrificial layer including the supporting members; removing portions of the temperature compensating layer formed on top of each of the supporting members; depositing an elastic layer on top of the temperature compensating layer including the supporting members; forming a conduit in each of the supporting members, the conduit extending from top of the elastic layer to top of the connecting terminal; depositing a second thin film and a thin film electrodisplacive layers on top of the elastic layer including the conduits; patterning the thin film electrodisplacive and the second thin film layers into an array of M×N thin film electrodisplacive members and an array of M×N second thin film electrodes, respectively, in such a way that each of the thin film electrodisplacive members and second thin film electrodes is cantilevered on each of the supporting members, thereby making the second thin film electrode to be electrically connected to the conduit and hence the connecting terminal, each of the thin film electrodisplacive members and the second thin film electrodes having side surfaces; depositing a first thin film layer on top of the thin film electrodisplacive members and the elastic layer including the side surfaces of each of the thin film electrodisplacive members and the second thin film electrodes; removing a portion of the first thin film layer formed on one side surface of each of the thin film electrodisplacive members and the second thin film electrodes, thereby segmenting the first thin film layer; forming an insulating member in each of the removed portions of the first thin film layer; patterning the first thin film, the elastic and the temperature compensating layers into an array of M×N first thin film electrodes, an array of M×N elastic members and an array of M×N temperature compensating members, respectively, thereby exposing the thin film sacrificial layer, wherein each of the insulating members defines the first thin film electrode into a front and a remaining portions; and removing the thin film sacrificial layer, thereby forming the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1A:
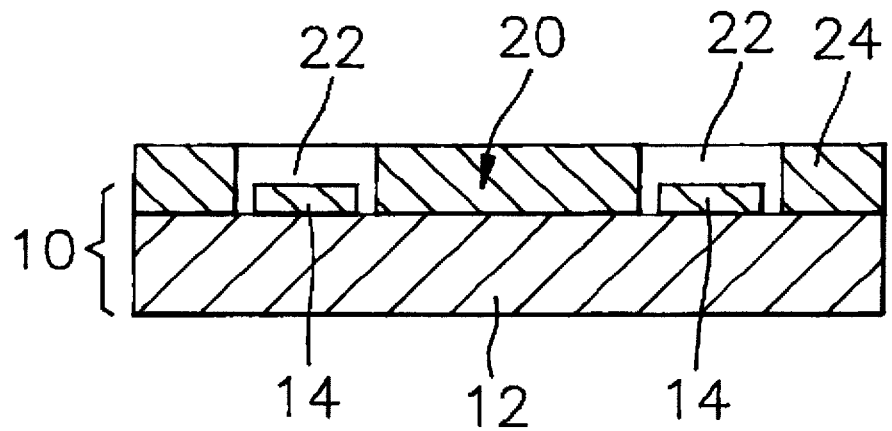
FIGS. 1A to 1G are schematic cross sectional views illustrating a method for the manufacture of an array of M×N thin film actuated mirrors previously disclosed.
Figure 1B:
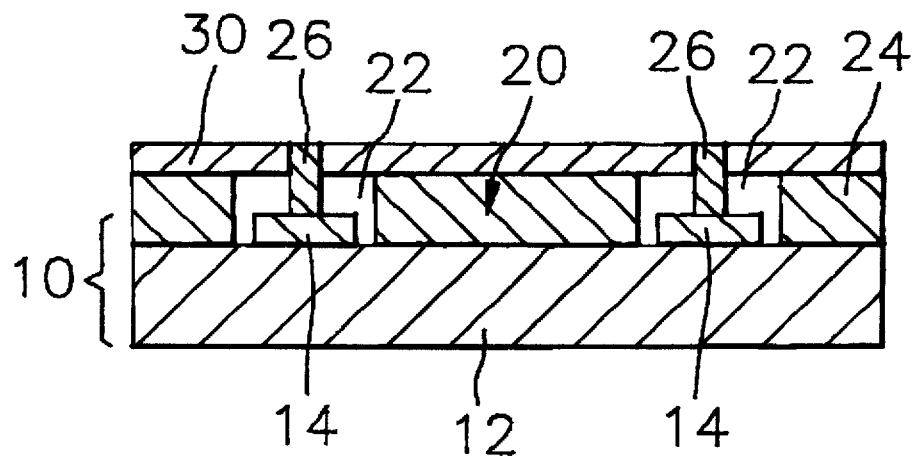
Figure 1C:
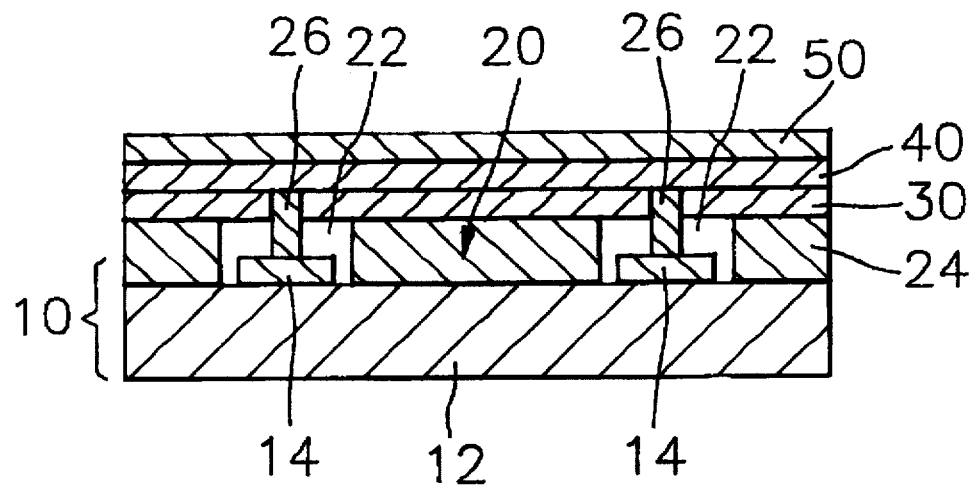
Figure 1D:
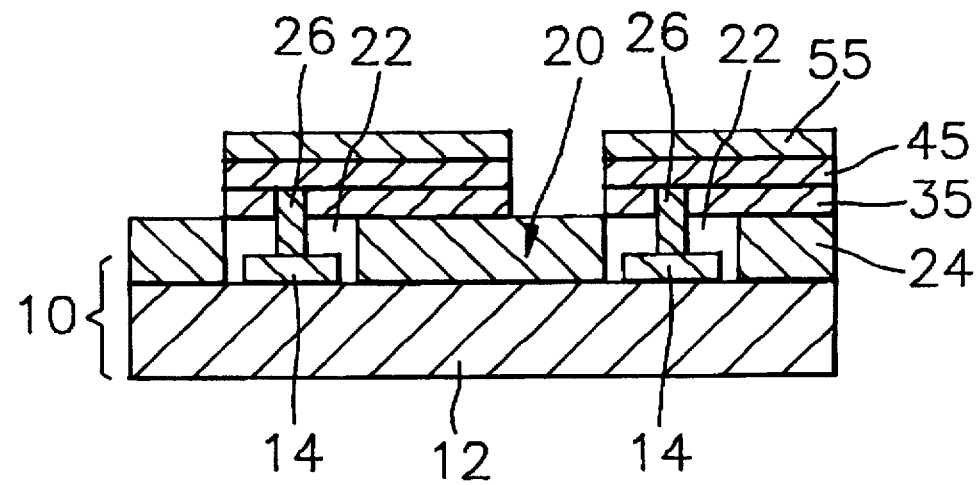
Figure 1E:
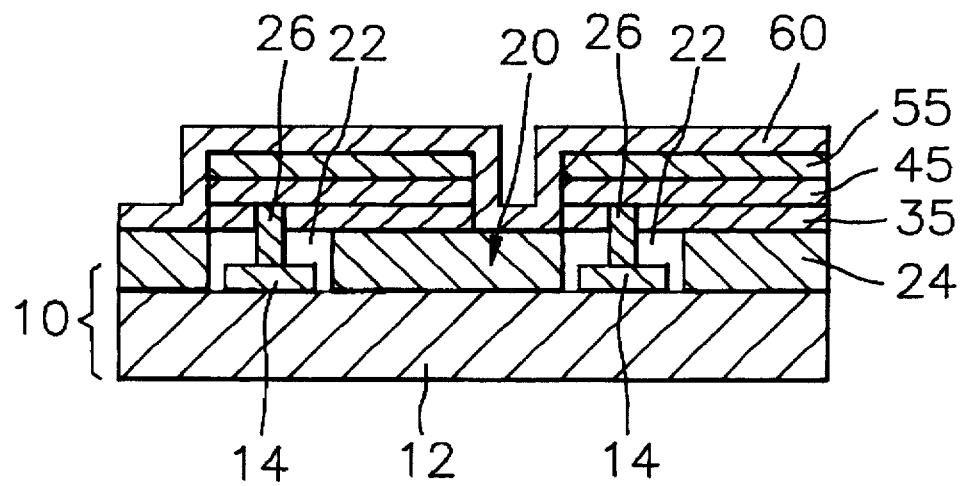
Figure 1F:
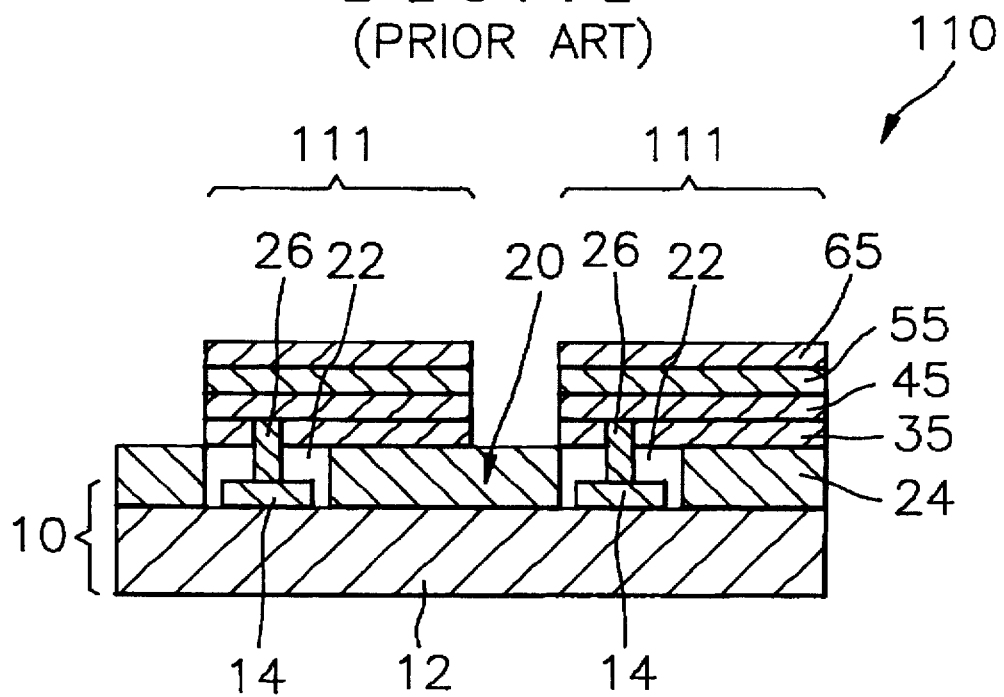
Figure 1G:
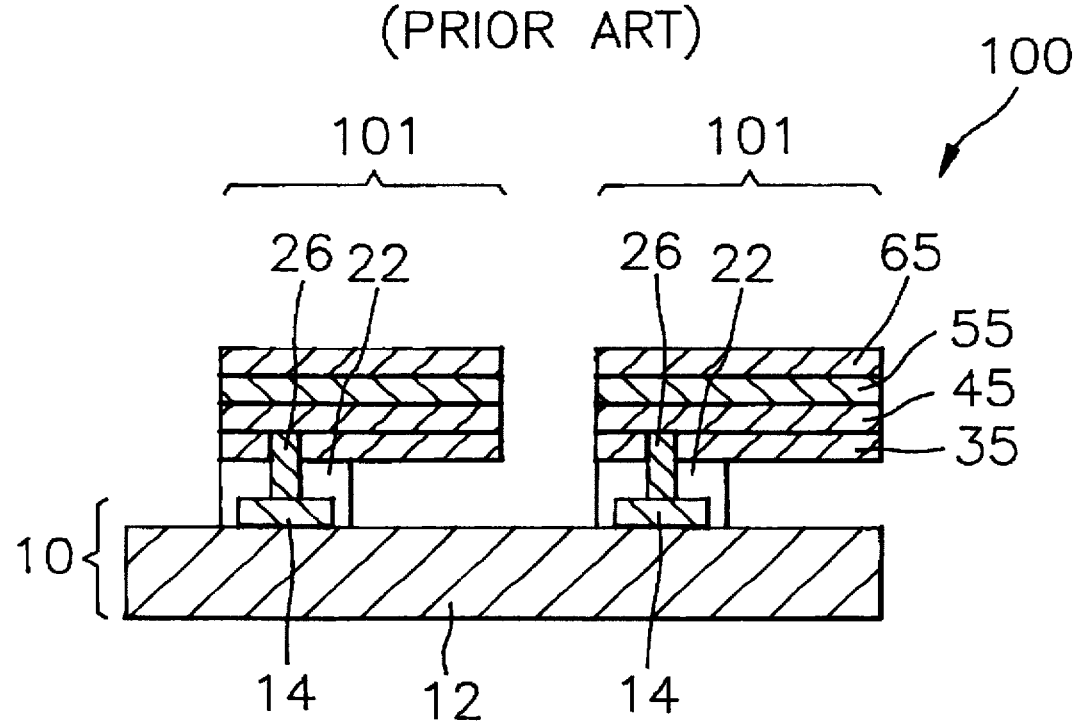

There are provided in FIGS. 2 and 3A to 3G a cross sectional view of an array 300 of M×N thin film actuated mirrors 301, wherein M and N are integers, for use in an optical projection system and schematic cross sectional views setting forth a method for the manufacture of the array 300 of M×N thin film actuated mirrors 301, respectively, in accordance with the present invention. It should be noted that like parts appearing in FIGS. 2 and 3A to 3G are represented by like reference numerals.

Figure 2:
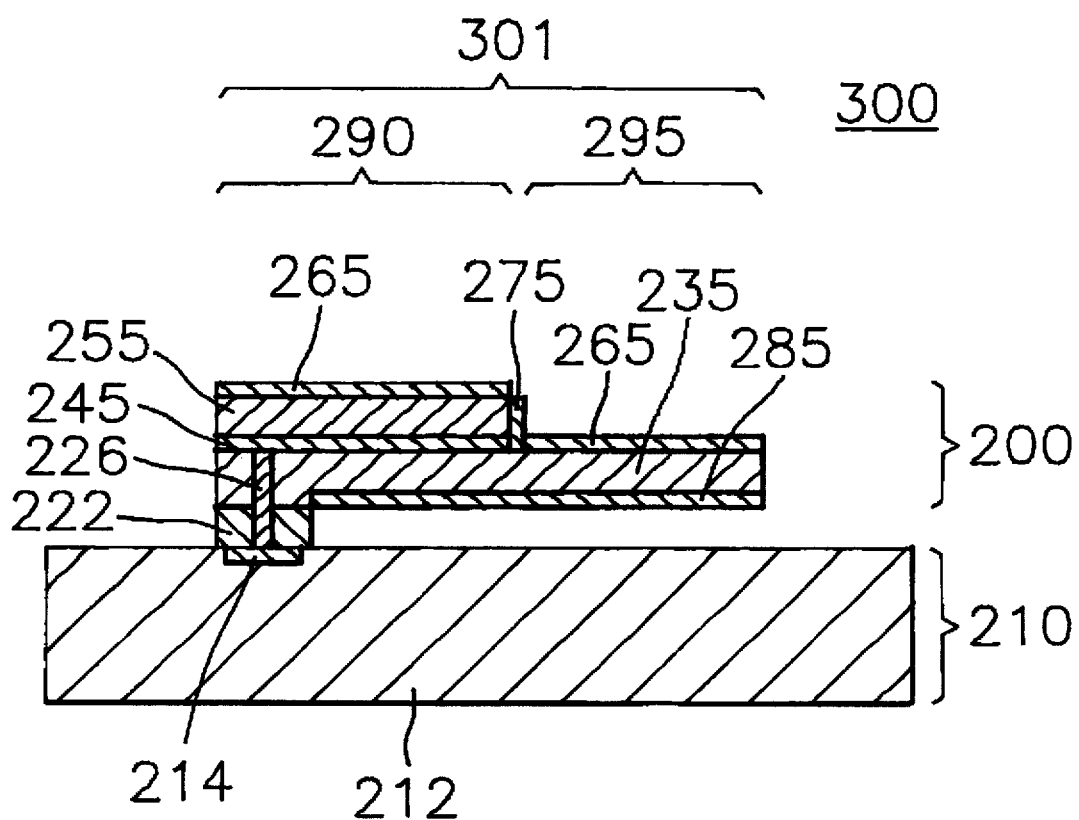
FIG. 2 is a cross sectional view of an array of M×N thin film actuated mirrors in accordance with the present invention.

In FIG. 2, there is provided a cross sectional view of an array 300 of M×N thin film actuated mirrors 301 in accordance with the present invention, the array 300 comprising an active matrix 210, an array of M×N supporting members 222 and an array of M×N actuating structures 200.

The active matrix 210 includes a substrate 212 with an array of M×N connecting terminals 214 and an array of M×N transistors(not shown). Each of the connecting terminals 214 is electrically connected to a corresponding transistor in the array of transistors.

Each of the supporting members 222 is made of an insulating material, e.g., silicon nitride, and is formed around top of the connecting terminals 214.

Each of the actuating structures 200 is cantilevered to each of the supporting members 222, and includes a first thin film electrode 265, a thin film electrodisplacive member 255, a second thin film electrode 245, an elastic member 235, an insulating member 275, a temperature compensating member 285 and a conduit 226. The first and the second thin film electrodes 265, 245 are placed at top and bottom of the thin film electrodisplacive member 255, respectively. The elastic member 235 is placed at bottom of the second thin film electrode 245. The temperature compensating member 285 is located below the elastic member 235.

Each of the actuating structures 200 is provided with an actuating and a light reflecting portions 290, 295. The actuating portion 290 in each of the actuating structures 200 includes a front portion of the first thin film electrode 265 functioning as a mirror and a bias electrode in each of the actuating structures 200, the thin film electrodisplacive member 255, the second thin film electrode 245 functioning as a signal electrode by being electrically connected to the connecting terminal 214 through the conduit 226, a front portion of the elastic member 235 and a portion of the temperature compensating member 285. The light reflecting portion 295 in each of the actuating structures 200 includes the remaining portion of the first thin film electrode 265 functioning also as a mirror, that of the elastic member 235 and that of the temperature compensating member 285. Each of the insulating members 275 defines the actuating and the light reflecting portions 290,295 by electrically disconnecting the front portion and the remaining portion of the first thin film electrode 265 in each of the actuating structures 200.

Each of the temperature compensating members 285 is made of a material having nearly the same thermal expansion coefficient as the material making the first thin film electrode 265 functioning as the mirror. Each of the temperature compensating members 285 is provided in each of the thin film actuated mirrors 301 to maintain the physical integrity of each of the actuating structures 200, even in the presence of a drastic temperature change. Each of the temperature compensating members 285 also can be made of the same material as the second thin film electrode 245.

In addition, since each of the actuating structures 200 is divided into the actuating and the light reflecting portions 290, 295 by the insulating member 275, during the operation of the thin film actuated mirror 301, the light reflecting portion 295 in each of the actuating structures 200 remains flat, thereby increasing the optical efficiency of the array 300.

It should be understood that, the second thin film electrode 245 may be made of a light reflecting and electrically conducting material, and the method for manufacturing the array 300 can be easily modified to meet such a change.

In FIG. 3A to 3G, there are provided schematic cross sectional views setting forth a method for the manufacture of the array 300 of M×N thin film actuated mirrors 301 shown in FIG. 2.

The process for the manufacture of the array 300 begins with the preparation of an active matrix 210 including a substrate 212 with an array of M×N connecting terminals 214 and an array of M×N transistors(not shown), wherein each of the connecting terminals 214 is electrically connected to a corresponding transistor in the array of transistors.

In a subsequent step, there is formed on top of the active matrix 210 a thin film sacrificial layer 224, having a thickness of 0.1–2 μm, and made of a metal, e.g., copper(Cu) or nickel(Ni), a phosphor-silicate glass(PSG) or a poly-Si. The thin film sacrificial layer 224 is formed by using a sputtering or an evaporation method if the thin film sacrificial layer 224 is made of a metal, a chemical vapor deposition(CVD) method or a spin coating method if the thin film sacrificial layer 224 is made of a PSG, and a CVD method if the thin film sacrificial layer 224 is made of a poly-Si.

Next, there is formed an array of M×N empty slots(not shown) in the thin film sacrificial layer 224 by using a photolithography method. Each of the empty slots is located around top of the connecting terminals 214.

Thereafter, there is formed a supporting member 222 in each of the empty slots by using a sputtering or a CVD method. Each of the supporting members 222 is made of an insulating material, e.g., silicon nitride.

In an ensuing step, a temperature compensating layer 280, made of a material, e.g., Al or Au, having nearly the same or the same thermal expansion coefficient as the material making up the first thin film electrode 265 functioning as the mirror, and having the same thickness as the first thin film electrode 265, is deposited on top of the thin film sacrificial layer 224 including the supporting members 222 by using a sputtering or a vacuum evaporation method.

Figure 3A:
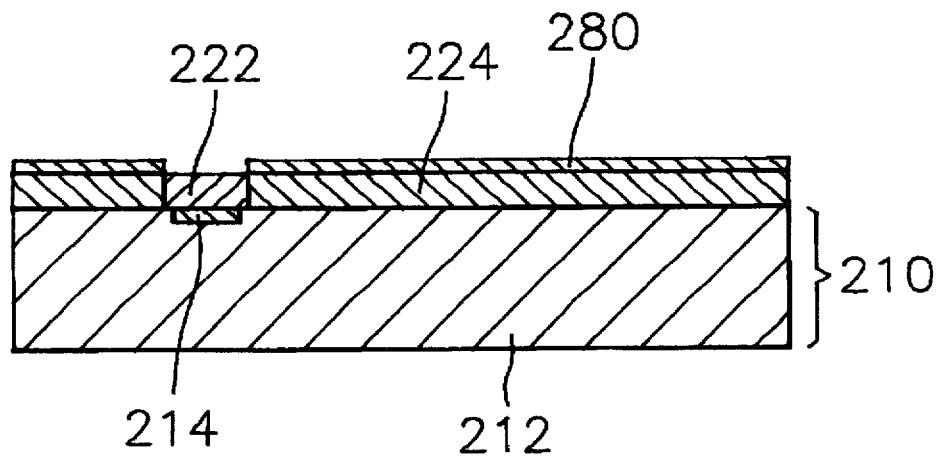
FIG. 3A to 3G are schematic cross sectional views setting forth a method for the manufacture of the array of M×N thin film actuated mirrors shown in FIG. 2.

Then, portions of the temperature compensating layer 280 formed on top of each of the supporting members 222 are removed by using a photolithography or a laser trimming method, as shown in FIG. 3A.

Subsequently, an elastic layer 230, made of the same material as the supporting member 222, and having a thickness of 0.1–2 μm, is deposited on top of the temperature compensating layer 280 including the supporting members 222 by using an evaporation method or a sputtering method.

Figure 3B:
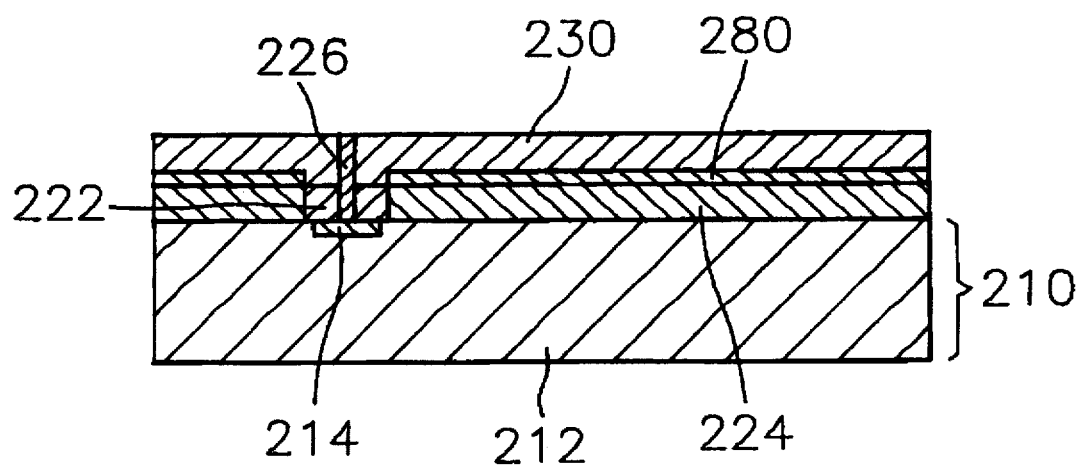

Thereafter, there is formed in each of the supporting members 222 a conduit 226 made of a metal, e.g., aluminum (Al). Each of the conduits 226 is formed by: first creating an array of M×N holes(not shown), each of the holes extending from top of the elastic layer 230 to top of the connecting terminals 214 by using an etching method; and filling therein with the metal by using a sputtering method, as shown in FIG. 3B.

In a following step, a second thin film layer(not shown), made of an electrically conducting material, e.g., platinum (Pt) or platinum/titanium(Pt/Ti), and having a thickness of 0.1–2 μm, is formed on top of the elastic layer 230 including the conduits 226 by using a sputtering or a vacuum evaporation method.

Next, a thin film electrodisplacive layer(not shown), made of a piezoelectric material, e.g., lead zirconium titanate (PZT), or an electrostrictive material, e.g., lead magnesium niobate(PMN), and having a thickness of 0.1–2 μm, is formed on top of the second thin film layer by using an evaporation method or a sputtering method. The thin film electrodisplacive layer is then heat treated to allow a phase transition to take place.

Figure 3C:
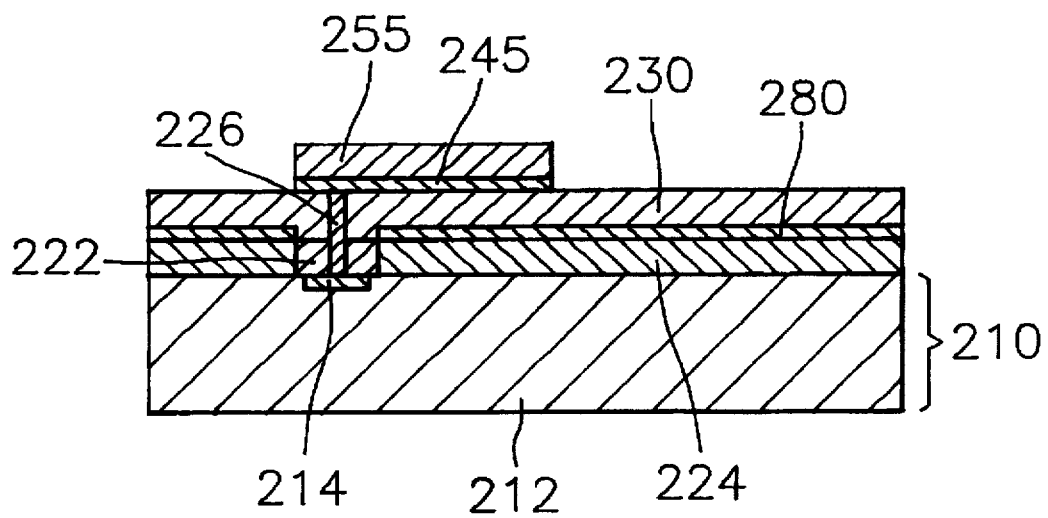

Then, as shown in FIG. 3C, the thin film electrodisplacive and the second thin film layers are patterned into an array of M×N thin film electrodisplacive members 255 and an array of M×N second thin film electrodes 245, respectively, by using a photolithography or a laser trimming method, in such a way that each of the thin film electrodisplacive members 255 and the second thin film electrodes 245 is cantilevered on each of the supporting members 222, thereby making the second thin film electrode 245 to be electrically connected to the conduit 226 and hence the connecting terminal 214. Each of the thin film electrodisplacive members 255 and the second thin film electrodes 245 is provided with side surfaces.

Since each of the thin film electrodisplacive members 255 is sufficiently thin, there is no need to pole it in case it is made of a piezoelectric material: for it can be poled with the electric signal applied during the operation of the thin film actuated mirrors 301.

Figure 3D:
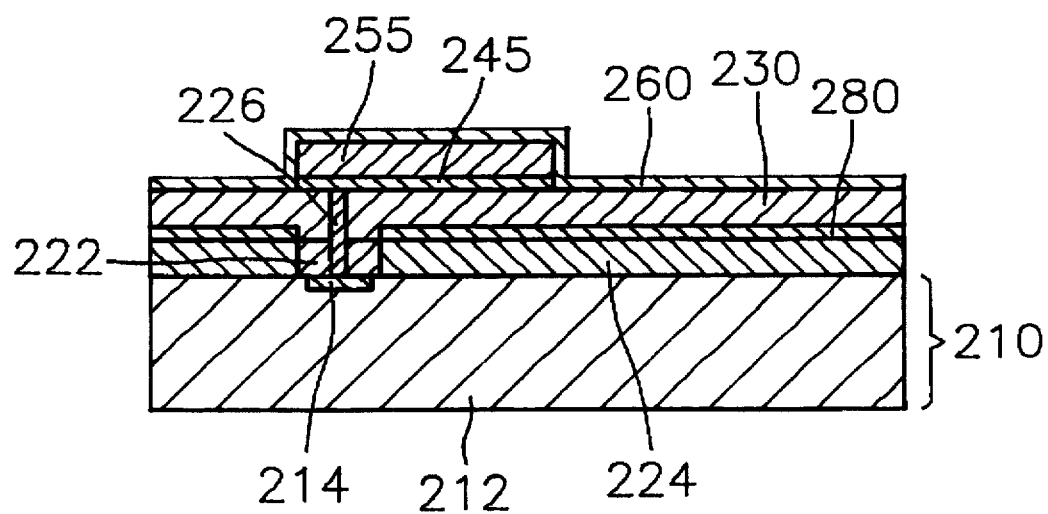

In an ensuing step, a first thin film layer 260, made of an electrically conducting and light reflecting material, e.g., aluminum(Al) or silver(Ag), and having a thickness of 0.1–2 μm, is deposited on top of the thin film electrodisplacive member 255 and the elastic layer 230 including the side surfaces of each of the thin film electrodisplacive members 255 and the second thin film electrodes 245 by using a sputtering or a vacuum evaporation method, as shown in FIG. 3D.

In a next step, a portion of the first thin film layer 260 formed on one side surface of each of the thin film electrodisplacive members 255 and the second thin film electrodes 245 is removed by using a photolithography or a laser trimming method, thereby segmenting the first thin film layer 260.

Figure 3E:
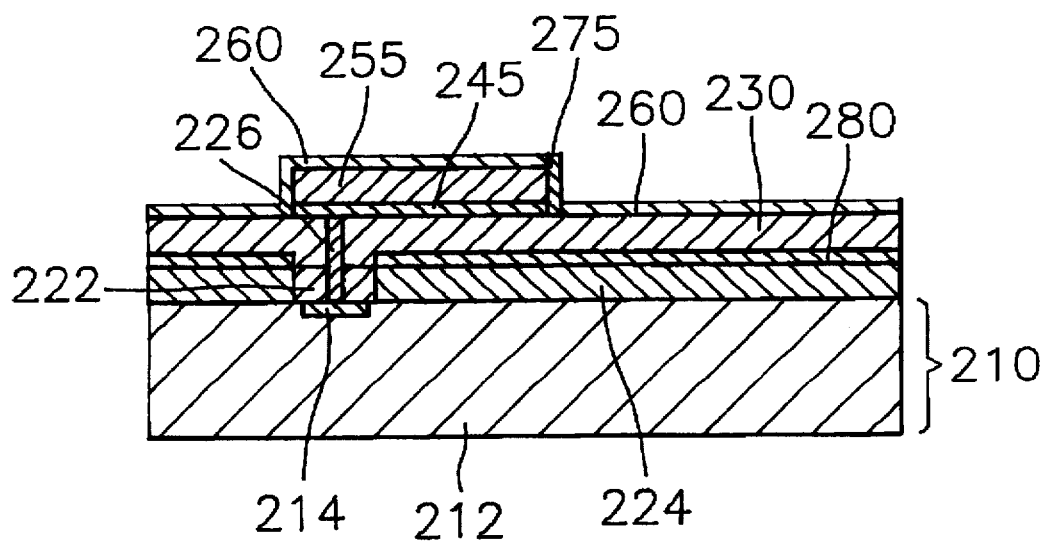

Next, an insulating member 275 made of an insulating material, is formed in each of the removed portions of the first thin film layer 260 by using an evaporation method or a sputtering method, as shown in FIG. 3E. The insulating member 275 also can be made of the same material as the supporting member 222 and the elastic layer 230.

Figure 3F:
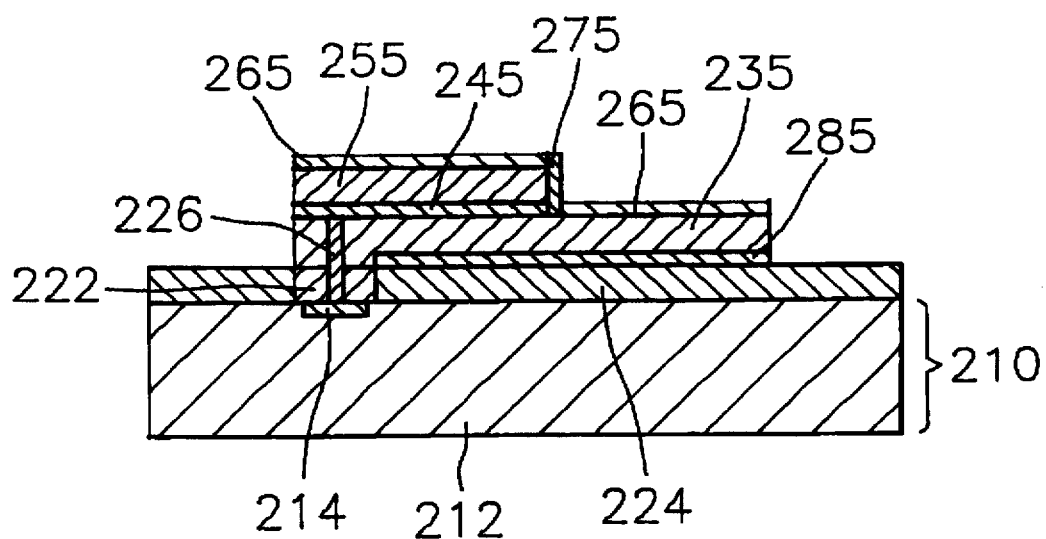

After the above step, the first thin film 260, the elastic 230 and the temperature compensating layers 280 are patterned into an array of M×N first thin film electrodes 265, an array of M×N elastic members 235 and an array of M×N temperature compensating members 285, respectively, thereby exposing the thin film sacrificial layer 224, by using a photolithography or a laser trimming method, as shown in FIG. 3F. Each of the insulating members 275 defines the first thin film electrode 265 into a front and a remaining portions.

Figure 3G:
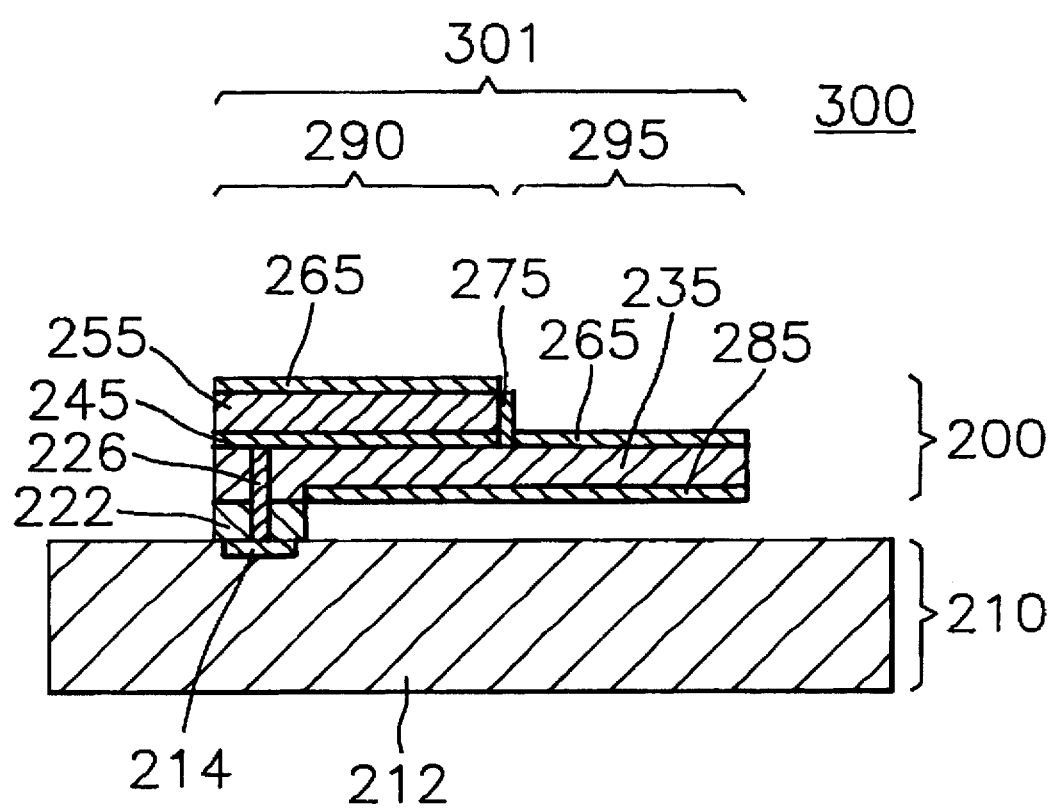

Finally, the thin film sacrificial layer 224 is removed by using an etching method thereby forming the array 300 of M×N thin film actuated mirrors 301, as shown in FIG. 3G.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, the array comprising:

an active matrix including a substrate with an array of M×N connecting terminals and an array of M×N transistors, wherein each of the connecting terminals is electrically connected to a corresponding transistor in the array of transistors;

an array of M×N supporting members; and an array of M×N actuating structures, each of the actuating structures being cantilevered to each of the supporting members, each of the actuating structures including a first thin film electrode, a thin film electrodisplacive member, a second thin film electrode, an elastic member, an insulating member, a temperature compensating member and a conduit, the first and the second thin film electrodes being placed at top and bottom of the thin film electrodisplacive member, respectively, the elastic member being placed at bottom of the second thin film electrode, the temperature compensating member being located below the elastic member, and each of the actuating structures being divided into an actuating and a light reflecting portions, wherein the actuating portion includes a front portion of the first thin film electrode functioning as a mirror and a bias electrode in each of the actuating structures, the thin film electrodisplacive member, the second thin film electrode functioning as a signal electrode by being electrically connected to the connecting terminal through the conduit, a front portion of the elastic member and a portion of the temperature compensating member, and the light reflecting portion is provided with the remaining portion of the first thin film electrode functioning also as the mirror, that of the elastic member and that of the temperature compensating member, the insulating member defining the actuating and the light reflecting portions by electrically disconnecting the front portion and the remaining portion of the first thin film electrode in each of the actuating structures.

2. The array of claim 1, wherein the first thin film electrode is made of an electrically conducting and light reflecting material.

3. The array of claim 1, wherein the second thin film electrode is made of an electrically conducting material.

4. The array of claim 1, wherein each of the temperature compensating members is a material having nearly a same thermal expansion coefficient as the first thin film electrode.

5. The array of claim 1, wherein each of the temperature compensating members is the same material as the first thin film electrode.

6. The array of claim 1, wherein each of the temperature compensating members is a material having nearly the same thermal expansion coefficient as the second thin film electrode.

7. The array of claim 1, wherein each of the temperature compensating members is the same material as the second thin film electrode.

8. The array of claim 1, wherein the first and the second thin film electrodes are made of an electrically conducting and light reflecting material.

9. A method for the manufacture of an array of M×N thin film actuated mirrors, wherein M and N are integers, for use in an optical projection system, the method comprising the steps of:

providing an active matrix including a substrate with an array of M×N connecting terminals and an array of M×N transistors;

depositing a thin film sacrificial layer on top of the active matrix;

creating an array of M×N empty slots in the thin film sacrificial layer, each of the empty slots being located around top of the connecting terminals;

forming a supporting member in each of the empty slots;

depositing a temperature compensating layer on top of the thin film sacrificial layer including the supporting members;

removing portions of the temperature compensating layer formed on top of each of the supporting members;

depositing an elastic layer on top of the temperature compensating layer including the supporting members;

forming a conduit in each of the supporting members, the conduit extending from top of the elastic layer to top of the connecting terminal;

depositing a second thin film and a thin film electrodisplacive layers on top of the elastic layer including the conduits;

patterning the thin film electrodisplacive and the second thin film layers into an array of M×N thin film electrodisplacive members and an array of M×N second thin film electrodes, respectively, in such a way that each of the thin film electrodisplacive members and second thin film electrodes is cantilevered on each of the supporting members, thereby making the second thin film electrode to be electrically connected to the conduit and hence the connecting terminal, each of the thin film electrodisplacive members and the second thin film electrodes having side surfaces;

depositing a first thin film layer on top of the thin film electrodisplacive members and the elastic layer including the side surfaces of each of the thin film electrodisplacive members and the second thin film electrodes;

removing a portion of the first thin film layer formed on one side surface of each of the thin film electrodisplacive members and the second thin film electrodes, thereby segmenting the first thin film layer;

forming an insulating member in each of the removed portions of the first thin film layer;

patterning the first thin film, the elastic and the temperature compensating layers into an array of M×N first thin film electrodes, an array of M×N elastic members and an array of M×N temperature compensating members, respectively, thereby exposing the thin film sacrificial layer, wherein each of the insulating members defines the first thin film electrode into a front and a remaining portions; and removing the thin film sacrificial layer, thereby forming the array of M×N thin film actuated mirrors.

10. The method of claim 9, wherein the first thin film layer is made of an electrically conducting and light reflecting material.

11. The method of claim 9, wherein the second thin film layer is made of an electrically conducting material.

12. The method of claim 9, wherein each of the temperature compensating layer is made of a material having nearly the same thermal expansion coefficient as the first thin film electrode.

13. The method of claim 9, wherein each of the temperature compensating layer is made of the same material as the first thin film electrode.

* * * * *